United States Patent [19]
Sokn

[11] Patent Number: 5,874,679
[45] Date of Patent: *Feb. 23, 1999

[54] PRESSURE SENSOR PACKAGE AND METHOD OF MAKING THE SAME

[75] Inventor: Erick L. Sokn, Janesville, Wis.

[73] Assignee: SSI Technologies, Inc., Janesville, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 628,376

[22] Filed: Apr. 4, 1996

[51] Int. Cl.$^6$ .................................. G01L 7/00; G01L 7/08
[52] U.S. Cl. .................................. 73/706; 73/715; 73/723
[58] Field of Search ............................... 73/706, 715, 723

[56] References Cited

U.S. PATENT DOCUMENTS

| | | | |
|---|---|---|---|
| 3,322,890 | 5/1967 | Kennedy et al. | 174/152 |
| 3,398,333 | 8/1968 | Zeppieri | 317/230 |
| 3,897,131 | 7/1975 | Stauffer | 339/220 |
| 3,909,924 | 10/1975 | Vindasius et al. | 29/574 |
| 4,047,490 | 9/1977 | Carino | 339/220 |
| 4,148,408 | 4/1979 | Wolf | 220/200 |
| 4,379,279 | 4/1983 | Nasiri | 338/42 |
| 4,454,398 | 6/1984 | Aschenbach et al. | 200/302.3 |
| 4,525,022 | 6/1985 | Murray | 339/220 |
| 4,655,088 | 4/1987 | Adams | 73/756 |
| 4,686,764 | 8/1987 | Adams et al. | 29/592 |
| 4,732,042 | 3/1988 | Adams | 73/706 |

(List continued on next page.)

FOREIGN PATENT DOCUMENTS

| | | | |
|---|---|---|---|
| 0 467 677 A2 | 7/1991 | European Pat. Off. | G01L 7/08 |
| 0 545 319 A2 | 11/1992 | European Pat. Off. | G01L 9/06 |
| 0 674 360 A1 | 9/1995 | European Pat. Off. | H01R 13/41 |
| 916.664 | 12/1946 | France | 73/706 |
| 94 06 625.6 | 7/1994 | Germany | G01L 9/00 |
| 44 10 455 C1 | 6/1995 | Germany | H01R 13/405 |
| 2 118 724 | 11/1983 | United Kingdom | 73/706 |
| WO 94/04897 | 3/1994 | WIPO | G01L 9/06 |

OTHER PUBLICATIONS

*Siemens Aktiengesellschaft*, Temeperature and Pressure Sensor Data Book, (1990–1991); pp. 93–97.

Motorla Pressure Sensor Device Data; Motorola, Inc. 1990.

Eugene Svoboda, "Passive Compensation of a Monolithic Silicon Pressure Transducer", Sensym, Inc., 1986.

P.E.M. Frere, S.J. Prosser, "Temperature Compensation of Silicon Pressure Sensors For Automatic Applications", Lucas Research Center, Lucas Engineering & Systems Ltd., U.K., pp. 270–274.

Yamada, et al., "A Piezoresistive Integrated Pressure Sensor", Sensors and Actuators, 4 (1983); pp. 63–69.

Xian–Ping Wu, et al., "An Integrated Pressure Transducer For Biomedical Applications", Sensors and Actuators, 2 (1982); pp. 309–320.

(List continued on next page.)

*Primary Examiner*—Joseph L. Felber
*Attorney, Agent, or Firm*—Michael Best & Friedrich LLP

[57] ABSTRACT

A pressure sensor package and method for producing the same. The package includes a pressure sensor base, a pressure sensor diaphragm positioned over the pressure sensor base, and a pressure sensor cap positioned over the pressure sensor diaphragm and secured relative to the pressure sensor base such that a portion of the pressure sensor diaphragm is deformed between the pressure sensor cap and the pressure sensor base. The deformation can occur along a line of deformation, preferably to form a closed path adjacent a periphery of the pressure sensor diaphragm. In one embodiment, the pressure sensor diaphragm is deformed between an inner surface of the pressure sensor cap and an outer surface of the pressure sensor base along the line of deformation, and the inner surface and the outer surface diverge from each other when moving away from the line of deformation. For example, the pressure sensor diaphragm can be deformed between a concave inner radius and a convex outer radius, wherein the inner radius is larger than the outer radius.

4 Claims, 2 Drawing Sheets

U.S. PATENT DOCUMENTS

| | | | |
|---|---|---|---|
| 4,744,863 | 5/1988 | Guckel et al. | 156/653 |
| 4,842,685 | 6/1989 | Adams | 156/308.2 |
| 4,853,669 | 8/1989 | Guckel et al. | 338/4 |
| 4,907,983 | 3/1990 | Wilson | 439/278 |
| 4,965,697 | 10/1990 | Mosser et al. | 338/36 |
| 4,996,082 | 2/1991 | Guckel et al. | 427/99 |
| 5,095,755 | 3/1992 | Peterson | 73/706 |
| 5,144,843 | 9/1992 | Tamura et al. | 73/727 |
| 5,184,107 | 2/1993 | Maurer | 338/42 |
| 5,212,989 | 5/1993 | Kodama et al. | 73/706 |
| 5,285,690 | 2/1994 | Koen et al. | 73/727 |
| 5,341,684 | 8/1994 | Adams et al. | 73/721 |

OTHER PUBLICATIONS

Willig, "Operational Amplifiers", EXAMplifications, May/Jun. 1993; pp. 256–258.

Poff, "Stable Miniature Pressure Transducer Using Inorganic Bonding Construction", Endevco Corporation, 1987; pp. 373–382.

Williams, "Good bridge–circuit design satisfies gain and balance criteria", *EDN Designers' Guide to Bridge Circuits*, Oct. 25, 1990; pp. 161–174.

Dresser Industries Brochure—Ashcroft "Model K1 Thin Film Pressure Transmitter".

Sensotec Brochure—"Subminiature Pressure Transducers", pp. 10–11.

Schultz, "Amplifiers for Semiconductor Pressure Sensors", Motorola Semiconductor Products, pp. 291–298.

Korane, "Silicon for High–Pressure Sensing", *Machine Design*, May 11, 1989; pp. 64–70.

Bicking, et al., "Sensor Packaging For High Volume Applications", IEEE 1985, pp. 350–351.

Kistler Measuring with Crystals; Kistler Instruments AG.

Industrial Pressure Transducer Model P27E Type, Trans–Metrics, Inc.

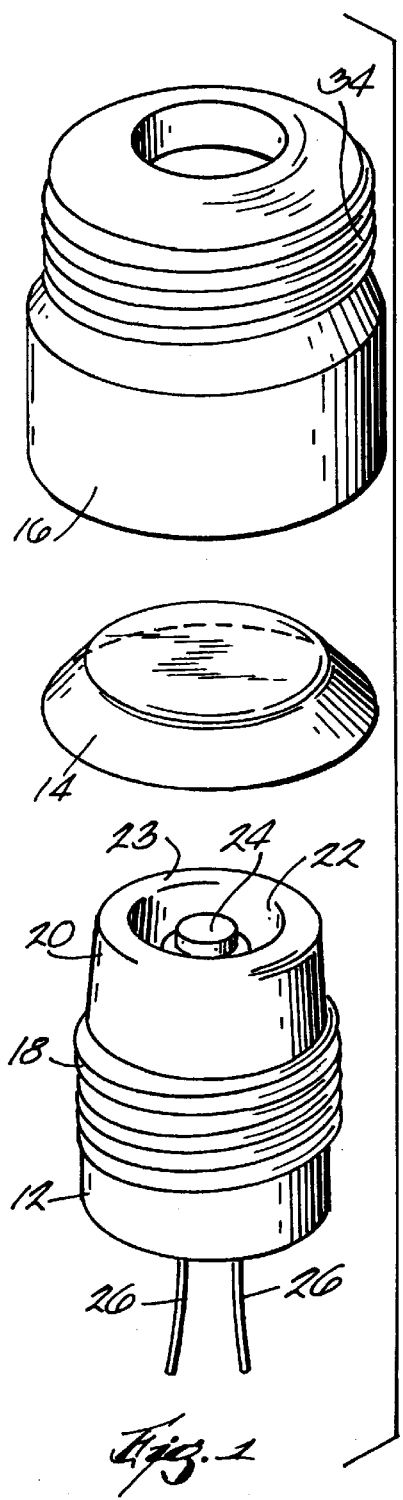
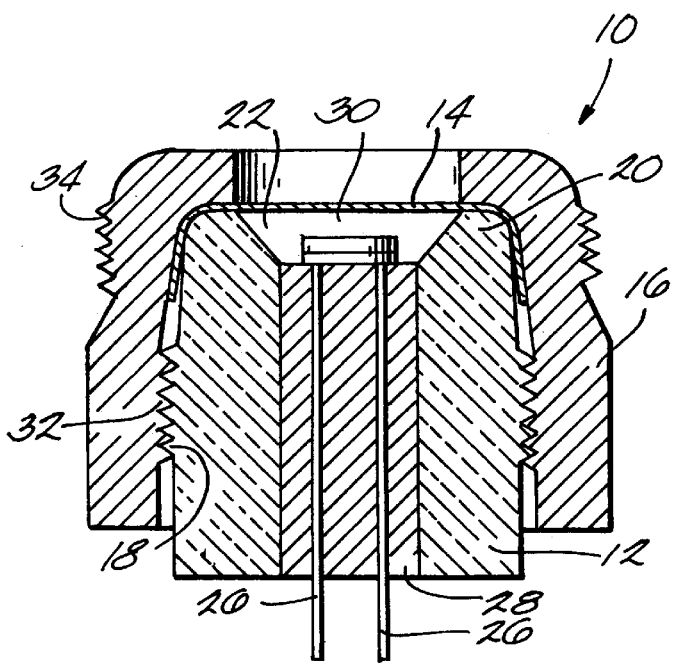
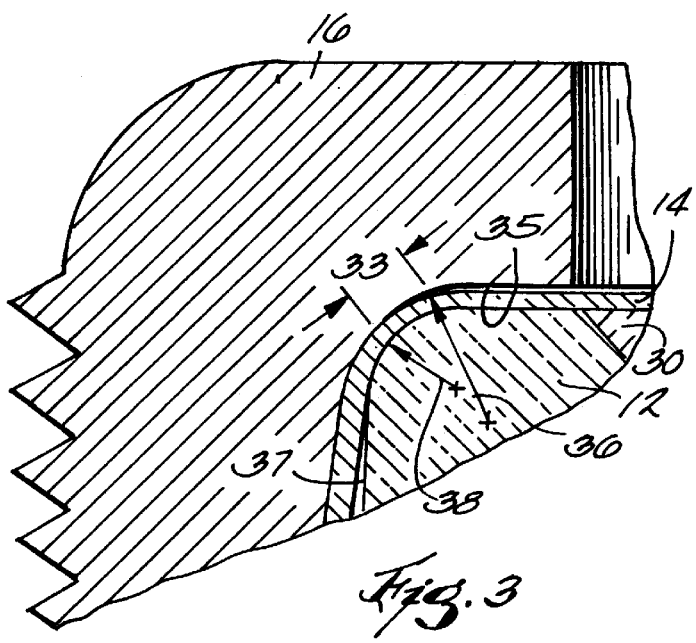

PRESSURE SENSOR PACKAGE AND METHOD OF MAKING THE SAME

FIELD OF THE INVENTION

The present invention generally relates to the field of pressure sensor packages, and more specifically to pressure sensor packages having a pressure chip sealed within a cavity by a diaphragm.

BACKGROUND OF THE INVENTION

Pressure sensors are used in a variety of areas, such as automotive and industrial applications, to provide an electrical signal corresponding with a measured fluid pressure. For example, pressure sensors can be used to measure automotive oil pressure and hydraulic fluid pressure.

One type of pressure sensor includes a solid state pressure sensing bridge, or chip, for generating an electrical signal corresponding with fluid pressure applied to the chip. Typically, the chip is mounted within a cavity of a base, and a fluid medium (e.g., silicone gel) is placed within the cavity to cover the chip. A diaphragm is secured to the base over the cavity to secure the gel within the cavity, and to create a sealed pressure sensor package. Alternatively, the gel can be injected into the cavity through a separate port after the diaphragm is secured to the base. In operation, pressure applied to the diaphragm deflects the diaphragm, is transmitted by the medium, thereby resulting in pressurization of the chip.

The diaphragm is commonly secured to the base by welding. Welding provides an adequate seal, but the operation can only be performed if both the base and the diaphragm are made of compatible metallic materials. In addition, the welding operation can be expensive, and can cause heat distortion of the components. Also, the welding typically must be done without the fluid medium in the cavity, thereby requiring the extra operations of injecting the fluid medium into the cavity and thereafter sealing the cavity without causing an unacceptable pressure offset pressure in the cavity.

SUMMARY OF THE INVENTION

In one aspect, the present invention provides a pressure sensor package wherein the diaphragm is secured to the base without the need for a welding operation. Avoiding the welding operation is believed to significantly improve the manufacturability of the package. Furthermore, since no welding is performed, the diaphragm and base can be made from a wider range of materials, such as non-metallic materials.

In one embodiment, the package includes a pressure sensor base, a pressure sensor diaphragm positioned on the base, and a pressure sensor cap positioned on the diaphragm and secured to the base such that a portion of the diaphragm is deformed between the cap and the base. The deformation of the diaphragm occurs along a line of deformation, preferably to form a closed path adjacent the periphery of the diaphragm. In one embodiment, the diaphragm is deformed between an inner surface of the cap and an outer surface of the base along the line of deformation, and the inner surface and the outer surface diverge from the line of deformation. For example, the diaphragm can be deformed between a concave inner radius and a convex outer radius, wherein the inner radius is larger than the outer radius.

In another aspect, the invention provides a method by which the diaphragm can be secured to the base without the need for a welding operation. This method can be performed with the fluid medium in the cavity, thereby eliminating the secondary operations of injecting the cavity with fluid medium and sealing the cavity. Furthermore, since no welding is performed, the diaphragm and base can be made from a wider range of materials, such as non-metallic materials.

In one embodiment, the method includes the steps of positioning a diaphragm over a base, placing a cap over the diaphragm, moving the cap toward the base, and deforming a portion of the pressure sensor diaphragm between the cooperating surfaces on the cap and the base. The step of deforming can include the step of deforming the diaphragm along a line of deformation, preferably to form a closed path adjacent a periphery of the diaphragm. In one embodiment, the base includes an upper surface and a cavity in the upper surface and, prior to the positioning step, the method further includes the step of depositing fluid into the cavity.

In yet another aspect the present invention provides a pressure sensor package wherein the cap and the diaphragm are integrally in a single piece. The package includes a pressure sensor base, and a pressure sensor cap positioned over and secured to the pressure sensor base. The pressure sensor cap includes a central portion having a first wall thickness, and a peripheral portion integrally formed with the central portion and having a second wall thickness greater than the first wall thickness, the peripheral portion being secured relative to the pressure sensor base. The central portion can include an interior side facing the pressure sensor base, wherein the interior side of the central portion is convex, and preferably substantially arcuate. At least part of the central portion preferably extends below an upper surface of the pressure sensor base and into a cavity formed in the upper surface.

BRIEF DESCRIPTION OF THE DRAWINGS

FIG. 1 is a perspective exploded view of a pressure sensor package embodying the present invention.

FIG. 2 is a section view of the package illustrated in FIG. 1 after assembly.

FIG. 3 is an enlarged view of a portion of the package illustrated in FIG. 2

DETAILED DESCRIPTION

Figure 4:
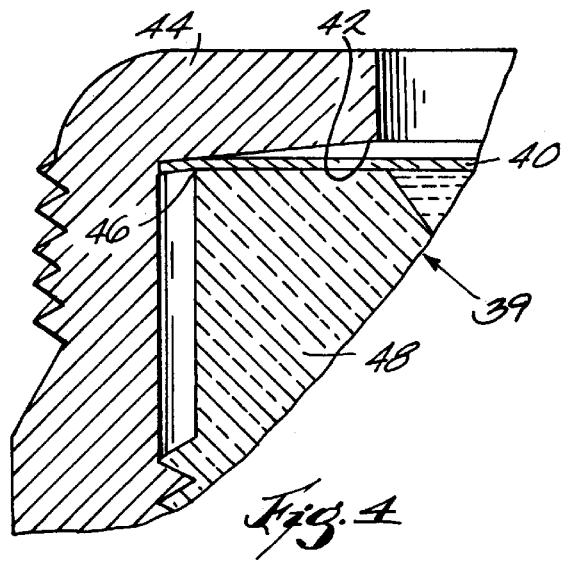
FIG. 4 is a partial section view of a second embodiment of the present invention.

FIGS. 1–3 illustrate a pressure sensor package 10 embodying the present invention. The package 10 includes a pressure sensor base 12, a pressure sensor diaphragm 14, and a pressure sensor cap 16 positioned over the diaphragm 14 and secured to the base 12. The base 12 includes external threads 18 for securing the cap 16 to the base 12. The base 12 further includes a cylindrical sidewall 20 defining a cavity 22 and an upper, annular surface 23. The package 10 also includes a pressure sensing chip 24 which is positioned within the cavity 22. A plurality of wires 26 operatively inter-connect with the chip 24 and extend out the bottom of the base 12.

The base 12 is preferably made from a metallic material, such as stainless steel or cold rolled steel. The pressure sensing chip 24 can be any appropriate chip for sensing fluid pressure, and the selection of which will depend in part on the pressures to be sensed. For example, the pressure sensing chip 24 can be any of a variety of pressure transducers, such as those described in commonly assigned U.S. Pat. No. 5,507,171, U.S. Pat. No. 4,744,863, U.S. Pat. No. 4,853,669 and U.S. Pat. No. 4,996,082, all of which are incorporated herein by reference. The wires 26 are sealed within the base 12 by an appropriate sealing material 28, such as glass, in a conventional manner.

The diaphragm 14 overlies the cavity 22 to provide a barrier to the entry of contaminants into the cavity 22. The diaphragm 14 is not welded to the base 12 as with prior art designs, but rather is held in place by the cap 16, as described below in more detail. Because the diaphragm 14 is not welded to the base 12, the diaphragm 14 can be made from non-metallic materials, such as elastomers, rubbers and plastics, and may also be made of metallic materials, such as stainless steel or plated cold rolled steel. In the illustrated embodiment, the diaphragm 14 is made of stainless steel.

The package 10 also includes (FIG. 2) a quantity of pressure transfer media 30 which substantially fills the cavity 22 and covers the chip 24. The pressure transfer media 30 occupies the cavity 22 between the diaphragm 14 and the chip 24 so that little or no air is within the cavity 22. The pressure transfer media 30 transfers pressures caused by deflection of the diaphragm 14 (caused, for example, by a change in pressure applied to the diaphragm) to the chip 24. In this regard, it is typically desirable to choose the pressure transfer media 30 to be a virtually incompressible material, such as is the case with many liquids and gels. In the illustrated embodiment, the pressure transfer media 30 is silicone gel.

The cap 16 includes internal threads 32 for securing the cap 16 to the base 12, and external threads 34 for securing the package 10 into a threaded port (not shown) for sensing fluid pressure within the port. The cap 16 is positioned over the diaphragm 14 to hold the diaphragm 14 in place and to provide a seal to prevent entry of foreign materials into the cavity 22. The seal is accomplished by providing an interface between the cap 16 and the base 12 such that the diaphragm 14 is contacted along a line of deformation in FIG. 3 by the zone identified by reference number 33. Such contact results in deformation of the diaphragm 14 when the cap 16 is threaded onto the base 12. This line contact is particularly important when the diaphragm 14 is made from a metallic material in order to concentrate the clamping force of the cap 16 to a narrowly defined localized area, thereby promoting deformation, and preferably plastic deformation, of the diaphragm 14. In this regard, because the illustrated diaphragm is made from stainless steel, the illustrated cap is also made from a metallic material, such as stainless steel.

Contact along a line or localized zone of deformation is facilitated by (FIG. 3) contacting the diaphragm 14 between an inner surface 35 of the cap 16 and an outer surface 37 of the base 12 such that the inner surface 35 and the outer surface 37 diverge from each other when moving away from the line of deformation. In the illustrated embodiment, such contact is achieved by contacting the diaphragm 14 between a concave inner radius 36 of the cap 16 and a convex outer radius 38 of the base 12, with the inner radius 36 being larger than the outer radius 38, as shown in FIG. 3.

FIG. 4 illustrates a pressure sensor assembly 39 which is similar to the package 10 and which is an alternative embodiment of the present invention. In the assembly 39, a diaphragm 40 optionally extends radially beyond the base 48 is compressed between a sloped surface 42 of a cap 44 and a sharp peripheral edge 46 of a base 48. The illustrated arrangement provides a line of contact between the cap 44 and the base 48 so that the force therebetween is concentrated, and the outer periphery of the diaphragm 40 beyond the base 48 is deflected by the sloped surface 42. Such concentration of the force results in deformation, and preferably plastic deformation, of the diaphragm 40.

Figure 5:
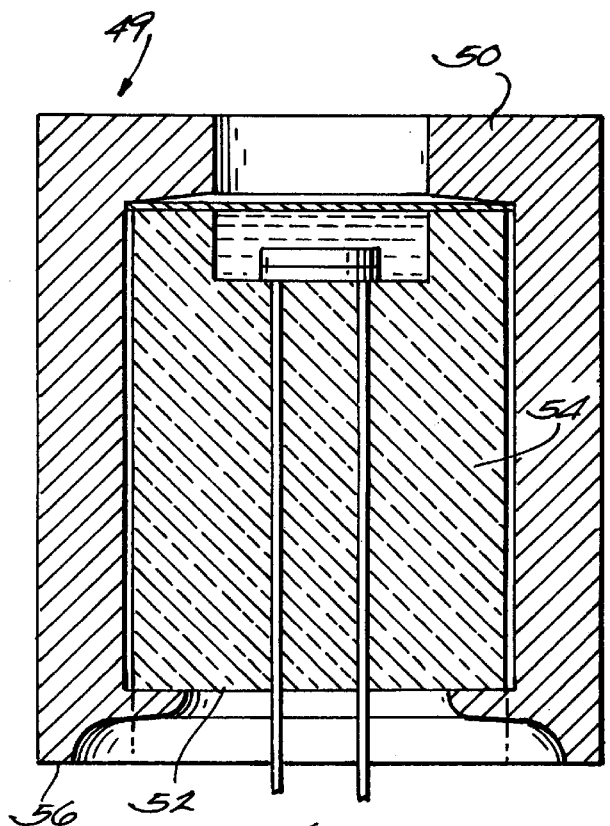
FIG. 5 is a partial section view of a third embodiment of the present invention.

Rather than utilizing a threaded interface for securing and compressing the cap relative to the base, other arrangements could be used. For example, FIG. 5 illustrates an assembly 49 which is similar to assemblies 10 and 39 and which is an alternative embodiment wherein a cap 50 extends beyond the bottom 52 of a base 54. In this embodiment, the bottom 56 of the cap 50 is plastically deformed around the bottom 52 of the base 54, or an appropriate ledge or groove (not shown) formed in the base 54. In such an arrangement, there is no need to provide threads on the base or internal threads on the cap. Rather, the cap 50 is secured to the base 54 by a simple plastic deformation, or coining, of the cap 50 around the base 54.

Assembly of the above-described pressure sensor packages can be performed by filling the cavity 22 with fluid, positioning the diaphragm over the base, placing the cap over the diaphragm, and moving the cap toward the base until the diaphragm is deformed therebetween. In the package illustrated in FIGS. 1–3, the step of moving includes the steps of engaging threads 32 on the cap 16 with threads 18 on the base 12, and rotating the cap 16 relative to the base 12. The respective diaphragms of the alternative embodiments shown in FIGS. 1–5 are deformed along lines of deformation that form a closed path adjacent a periphery of the pressure sensor diaphragm. Such closed path forms the desired barrier to the entry of contaminants into the cavity 22. For the package 49 illustrated in FIG. 5, the method further includes the step of deforming a portion of the cap 50 around a portion of the base 54 to thereby fix the cap 50 in position relative to the base 54.

Figure 6:
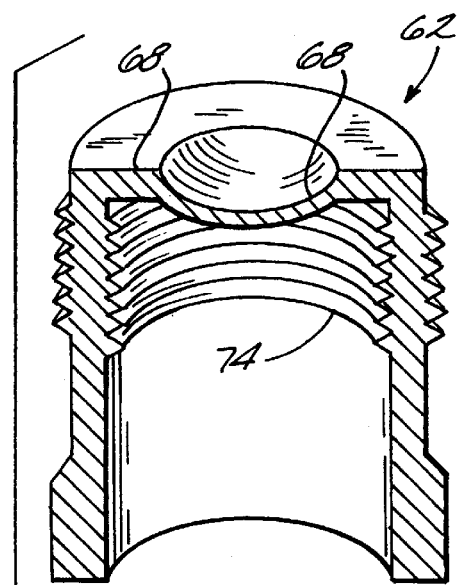
FIG. 6 is a perspective view of a fourth embodiment of the present invention.

FIG. 6 illustrates a pressure sensor package 60 that is a further alternative embodiment of the invention and that eliminates a leak path between the cap and the base. More specifically, the above-described and illustrated packages 10, 39 and 49 (FIGS. 1–5) generally have potential leak paths between the respective cap and the diaphragm and between the cap and the base. In contrast, the package 60 illustrated in FIG. 6 has only a leak path between the cap 62 and the base 64. This is accomplished by forming the cap 62 from a single piece of material to provide a central diaphragm portion 66 and an integral, peripheral cap portion 68 which is thicker than the diaphragm portion 66. For example, the cap portion 68 and the diaphragm portion 66 could be molded as a unitary structure. The side of the diaphragm portion 66 facing the cavity 70 is optionally arcuately convex such that the diaphragm portion 66 extends below the upper surface 72 of the base 64. Such a design facilitates movement of any air pockets out of the cavity 70 as the cap 62 is being secured to the base 64. That is, when the cap 62 is moved toward the base 64, the center of the diaphragm portion 66 will contact the fluid in the cavity 70 before any other part of the diaphragm portion 66. Further movement of the cap 62 toward the base 64 will result in the fluid contact point gradually moving radially outwardly on the diaphragm portion 66, thereby forcing air pockets to the outer perimeter of the cavity 70 and eventually out through the threads 74 and 76. The amount of fluid placed in the cavity 70 before assembly is only slightly more than the amount required for the final assembled package 60. The excess fluid will be allowed to leak out into the threads 74 and 76.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. For example, the materials used for the base, the diaphragm and the cap could vary from those described, depending on design constraints such as temperature, pressure and environmental issues. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A pressure sensor package, adapted to be exposed to a fluid medium to be sensed, said pressure sensor package comprising:

a pressure sensor base defining a cavity;

a pressure sensor diaphragm positioned over said cavity, wherein said pressure sensor diaphragm is deformed between a concave inner radius and a convex outer radius, and wherein said inner radius is larger than said outer radius; and a one-piece pressure sensor cap positioned over said pressure sensor diaphragm and secured to said pressure sensor base such that said pressure sensor cap and said pressure sensor base directly contact said pressure sensor diaphragm along a line of contact surrounding said cavity and seal said cavity.

2. A pressure sensor package comprising:

a pressure sensor base; and a pressure sensor cap positioned over and secured to said pressure sensor base, said pressure sensor cap including:

a central portion having a first wall thickness and including an interior side facing said pressure sensor base and an exterior side, said interior side of said central portion being convex when the pressures on said interior and exterior sides of said central portion are equal; and a peripheral portion integrally formed with said central portion and having a second wall thickness greater than said first wall thickness, said peripheral portion being secured relative to said pressure sensor base.

3. A pressure sensor package comprising:

a pressure sensor base; and a pressure sensor cap positioned over and secured to said pressure sensor base, said pressure sensor cap including:

a central portion having a side facing said pressure sensor base and an opposite side, said central portion having a first wall thickness, said central portion being substantially arcuate when the pressure on each side of said central portion is equal; and a peripheral portion integrally formed with said central portion and having a second wall thickness greater than said first wall thickness, said peripheral portion being secured relative to said pressure sensor base.

4. A pressure sensor package comprising:

a pressure sensor base including an upper surface and a cavity formed in said upper surface; and a pressure sensor cap positioned over and secured to said pressure sensor base, said pressure sensor cap including:

a central portion having a side facing said pressure sensor base and an opposite side, said central portion having a first wall thickness, at least part of said central portion extending into said cavity when the pressure on each side of said central portion is equal; and a peripheral portion integrally formed with said central portion and having a second wall thickness greater than said first wall thickness, said peripheral portion being secured relative to said pressure sensor base.

* * * * *